United States Patent [19]

Harding et al.

[11] Patent Number: 4,526,267
[45] Date of Patent: Jul. 2, 1985

[54] METHOD AND APPARATUS FOR STORING AND TRANSFERRING TIRES TO A HOOK CONVEYOR

[75] Inventors: Antony Harding, Schieren, Luxembourg; Roger Marthoz, Fouches, Belgium

[73] Assignee: The Goodyear Tire & Rubber Company, Akron, Ohio

[21] Appl. No.: 440,750

[22] Filed: Nov. 12, 1982

[51] Int. Cl.³ .............................................. B65G 47/24
[52] U.S. Cl. ..................................... 198/409; 198/466; 414/564; 414/672
[58] Field of Search .............. 198/477, 409, 491, 358, 198/678, 466, 469, 470, 406, 680; 414/908, 911, 662, 669, 672, 564

[56] References Cited

U.S. PATENT DOCUMENTS

| | | | |
|---|---|---|---|
| 1,500,776 | 7/1924 | Spooner | 198/477 X |
| 2,207,648 | 7/1940 | Wick | 198/409 |
| 2,226,742 | 12/1940 | Raymond | 198/379 X |
| 2,336,614 | 12/1943 | Jackson | 198/409 |
| 2,708,501 | 5/1955 | Boehm | 198/409 |
| 2,846,099 | 8/1958 | Sjoquist | 414/427 |
| 2,864,138 | 12/1958 | Pierce et al. | 198/477 X |
| 3,317,025 | 5/1967 | Schickle | 198/491 X |
| 3,993,200 | 11/1976 | Ide | 198/470 X |
| 4,116,327 | 9/1978 | Eglinton et al. | 198/560 |
| 4,304,619 | 12/1981 | Riggs | 156/126 |

FOREIGN PATENT DOCUMENTS

| | | | |
|---|---|---|---|
| 1108283 | 1/1956 | France | 414/672 |
| 468843 | 4/1975 | U.S.S.R. | 198/409 |
| 635015 | 11/1978 | U.S.S.R. | 414/426 |

Primary Examiner—Joseph E. Valenza
Assistant Examiner—Jonathan D. Holmes
Attorney, Agent, or Firm—Frederick K. Lacher; T. P. Lewandowski

[57] ABSTRACT

Completed, shaped and uncured tires are placed on an inclined chute having a gate mechanism for automatically transferring one tire to a tire carrier while the other tires are retained in the chute. The tire carrier raises and rotates the tire to an upper position for movement of a conveyor hook through a central aperture of the tire and into engagement with one side of the tire to move it out of the carrier into a supported position on the conveyor.

7 Claims, 4 Drawing Figures

METHOD AND APPARATUS FOR STORING AND TRANSFERRING TIRES TO A HOOK CONVEYOR

This invention relates generally, as indicated, to tire building and particularly to the storing and loading of completed, shaped and uncured tires on a hook conveyor after being assembled on the tire building machine. Still more particularly the invention relates to a method and apparatus for reducing the manual handling of the tires and eliminating waiting time for empty hooks on the hook conveyor.

According to one aspect of the invention there is provided a method of storing and transferring tires to a hook conveyor comprising placing said tires in the entrance end of a chute, moving said tires through said chute into engagement with a gate means at an exit end in said chute, opening said gate means to move at least one of said tires into a carrier, raising said carrier from a lower position into the path of said hook conveyor at an upper position, moving one of the hooks of said conveyor through a central aperture of one of said tires to move the tire out of said carrier.

According to another aspect of the invention there is provided an apparatus for storing and transferring tires to a hook conveyor comprising a chute having a supporting surface extending from an entrance end to an exit end, gate means for retaining and releasing the tires located at said exit end, a tire carrier movable between a lower position adjacent said exit end of said chute for receiving said tires and an upper position in the path of said hook conveyor for transferring said tires to said hook conveyor, means for raising and lowering said carrier between said lower position and said upper position, said tires in said upper position being in alignment with the path of the hook conveyor for movement of a hook of said conveyor into the central aperture of one of the tires for engagement with one side of the sidewall to move the tire out of said carrier.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and, as will become apparent to those skilled in these arts, can be modified in numerous ways within the spirit and scope of the invention defined in the claims hereof.

Figure 1:
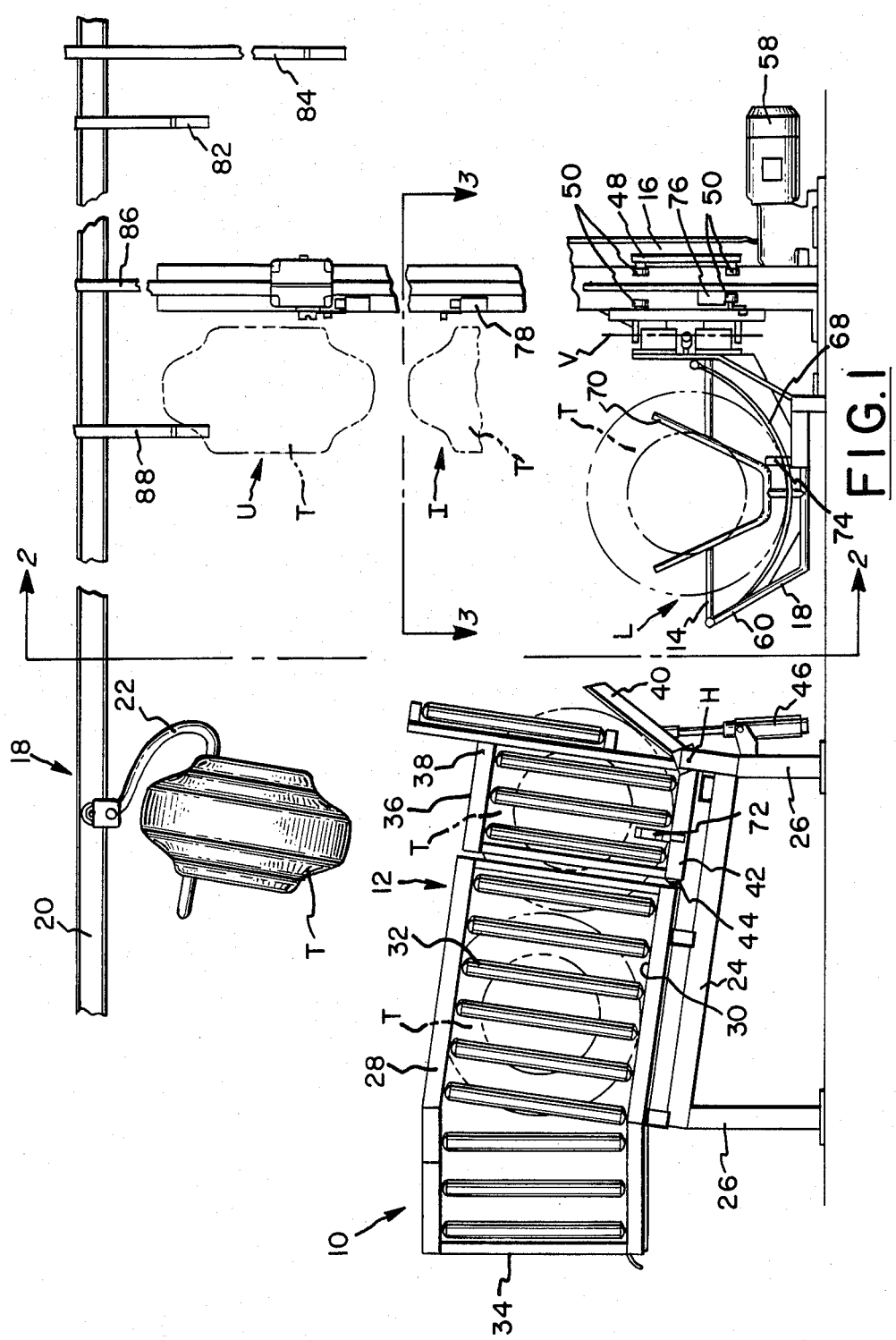
FIG. 1 is a side elevation of the apparatus embodying the invention with parts being broken away showing its relation to the hook conveyor. Tires in full and dot-dash lines are also shown in various positions on the apparatus and hook conveyor.
Figure 2:
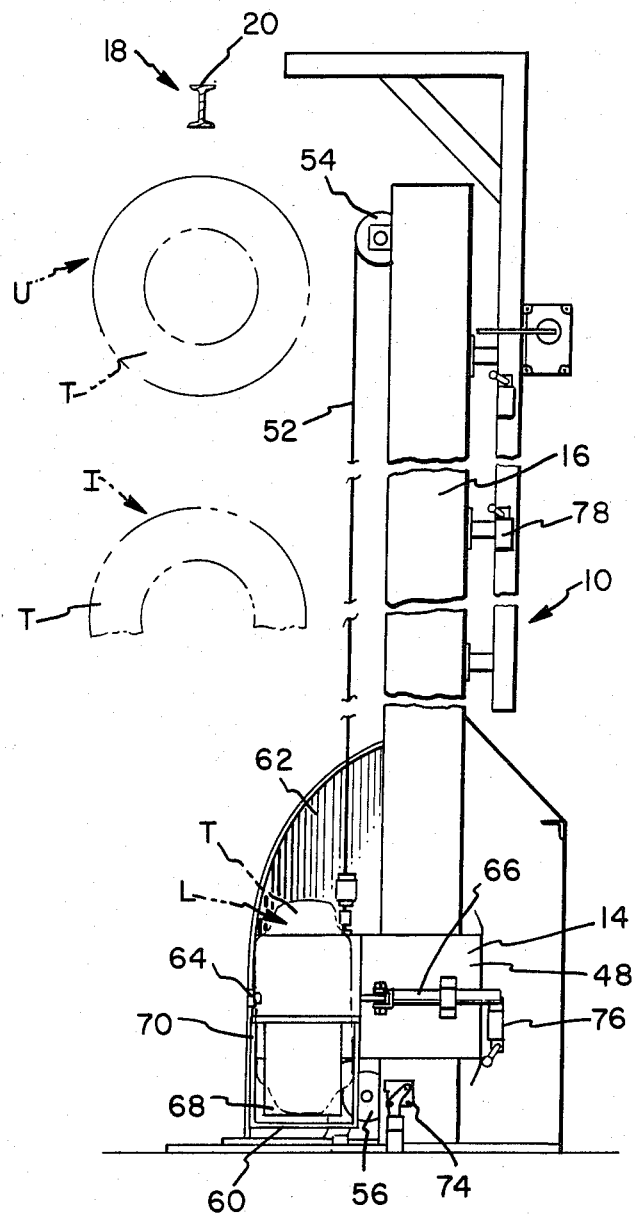
FIG. 2 is a sectional view taken along the line 2—2 in FIG. 1 with parts being broken away.

Referring to the drawings, the preferred embodiment of the present invention is shown which is preferably located adjacent a tire building machine for building radial tires. Referring specifically to FIG. 1, tire storing and transferring apparatus 10 is shown including a chute 12 which may be located to the right of a tire building machine (not shown). A tire carrier 14 is positioned to the right and below the chute 12. The tire carrier 14 is mounted on a vertical mast member 16 for movement vertically along the mast member from a lower position L supporting a tire T, as shown in FIGS. 1 and 2, to an upper position U indicated by the supported tire shown in dot-dash lines. A hook conveyor 18 is located above the chute 12 and adjacent the mast member 16 for conveying tires T to another area of the plant. The hook conveyor 18 may have a rail 20 for carrying hooks 22 suitable for movement into the central aperture of the tire T when supported by the tire carrier 14 in the upper position U as shown in FIGS. 1 and 2.

Figure 4:
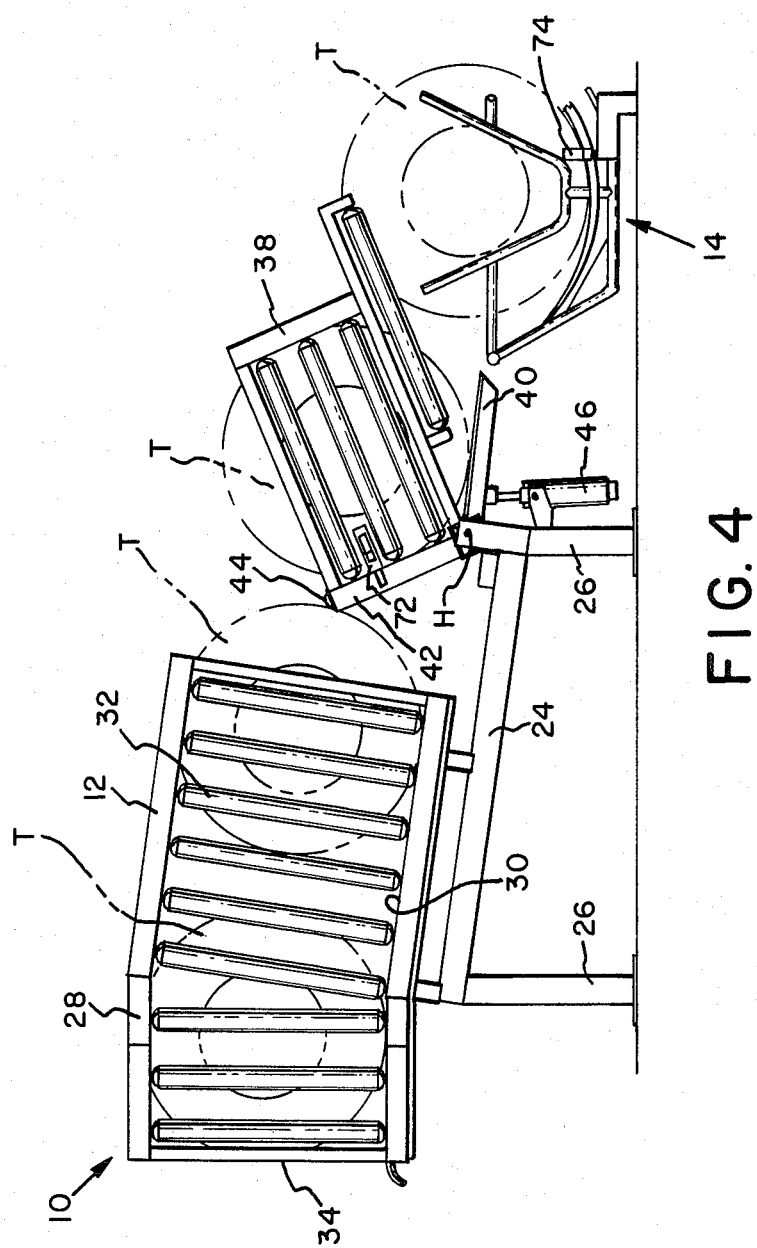
FIG. 4 is a schematic elevation of the chute and carrier showing the gate in the open position and the position of the tires in dot-dash lines.

The chute 12, shown in FIGS. 1 and 4, has a generally rectangular frame 24 supported on legs 26 at a height which is convenient for loading of the tires T. A generally U-shaped enclosure 28 is mounted on the frame 24 and includes a surface 30 for supporting the tires T and side members 32 for holding the tires in a generally upright position. The supporting surface 30 may be tilted and inclined downwardly from an entrance end 34 adjacent the tire building machine to an exit end 36 adjacent the carrier 14.

Gate means such as a rotatable section 38 of the enclosure 28 is provided at the exit end 36 and is rotatable about a horizontal axis H. The rotatable section 38 has a gate arm 40 at the exit end 36 which retains the tires T in the chute 12 when the gate means is closed, as shown in FIG. 1, and then rotates about the axis H to an inclined position, shown in FIG. 4, for releasing one of the tires T so that it may roll into the carrier 14. The surface of the rotatable section 38 forms a stop arm 42 which is lifted as the section rotates to the position shown in FIG. 4 and prevents the movement of the other tires T out of the chute 12 during the unloading of the tire in the rotatable section. A roller 44 at the end of the stop arm 42 permits movement of the arm relative to the tires T without damaging the tires.

Suitable actuating mechanism such as a pneumatic piston and cylinder 46 is mounted between the frame 24 and gate arm 40 for rotating the rotatable section 38 around the axis H. After transfer of the tire T from the tilted rotatable section 38 of the gate means, the piston and cylinder 46 rotates the section back into the position shown in FIG. 1 and the next tire T is moved into the section by rolling down the inclined surface 30.

Figure 3:
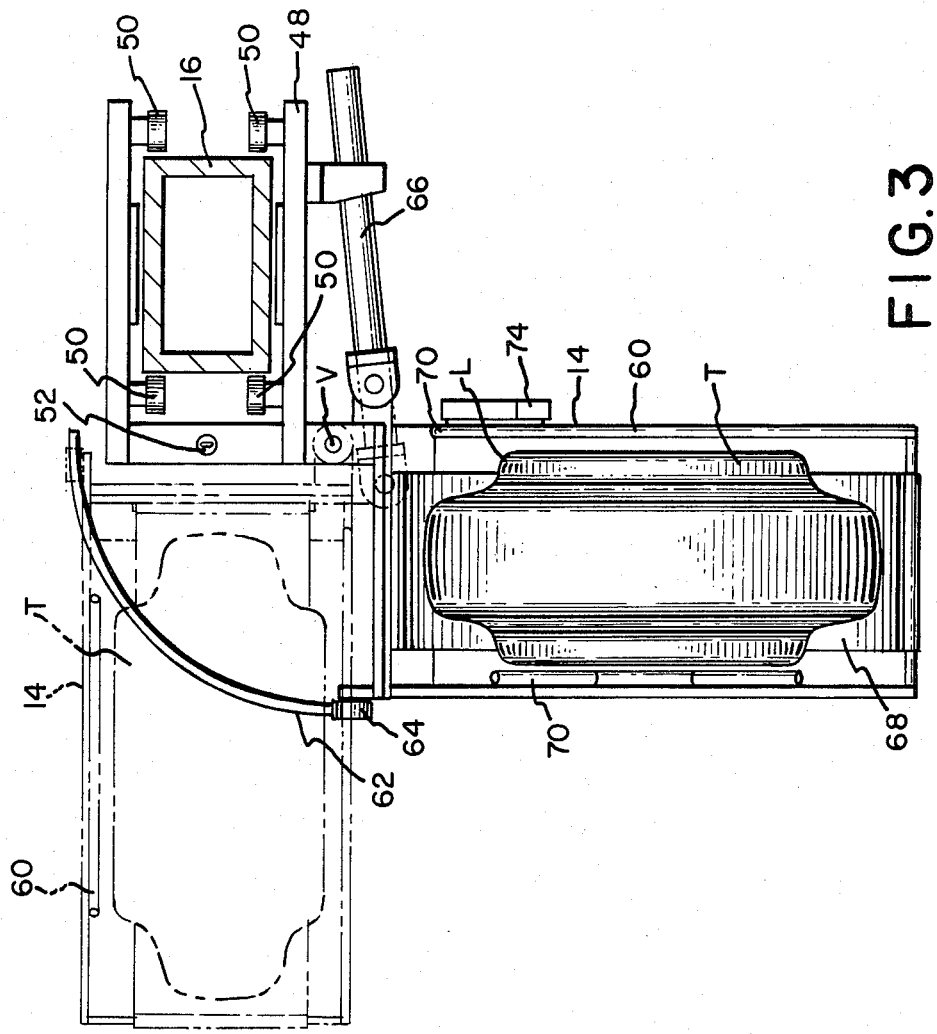
FIG. 3 is an enlarged sectional plan view taken along the line 3—3 in FIG. 1 showing the carrier basket with a tire in the lower position in solid lines and in the raised position in dot-dash lines.

Referring to FIGS. 1, 2 and 3, the tire carrier 14 includes a slide member 48 having rollers 50 for engagement with the mast member 16 during movement of the slide member vertically along the mast member. An elongated flexible support member such as chain 52 is fastened to the slide member 48 and extends over an upper idler sprocket 54 and a lower driven sprocket 56 which is connected to power means such as electric motor 58. A basket member 60 of the carrier 14 is pivotally mounted on the slide member 48 for rotation about a vertical axis V from the lower position L, shown in FIG. 3 in full lines, to a raised position, shown in chain-dotted lines.

A cam member 62 mounted on the mast member 16 has a cam surface engageable with a cam follower 64 mounted rotatably on the basket member 60. The basket member 60 is rotated during the lowering of the carrier 14 from the upper position U to the lower position L in a counterclockwise direction around the axis V by the cam member 62 and follower 64 to a position where the tire T is in alignment with the chute 12 in the lower position L. Resilient means such as compression spring 66 is mounted between the slide member 48 and the basket member 60 for urging the basket member in a clockwise direction around the axis V during the raising of the carrier 14 from the lower position L to the upper position U. Accordingly in the lower position L the basket member 60 is held in a position in alignment with the chute 12 by the cam follower 64 engaging the cam surface of cam member 62 and compressing the spring 66. As the carrier 14 is raised as by the chain 52, the compression spring 66 rotates the basket member 60 in a clockwise direction to the position shown in chain-dotted lines in FIG. 3 so that upon lifting of the carrier 14 to the upper position U the tire T will be in alignment with the path of the hook conveyor 18. Alternatively the carrier 14 may be raised to an intermediate position I, indicated by the supported tire T, where the tire is held at a position spaced from the hook conveyor 18 a sufficient distance so that tires on the hooks 22 may pass over the tires in the intermediate position of the carrier without interference.

The basket member 60 may have a sling 68 carried by the framework of the basket member for catching the tire T as it rolls from the chute 12. Side members 70 may be provided for maintaining the tire T in an upright position as it is raised to the upper position U. In the upper position U the tire T is in alignment with the path of the hook conveyor 18 and the hooks 22 may then enter the central apertures of the tires in the carrier 14 and engage the bead portions of each of the tires to support the tires in a position such as that shown in full lines in FIG. 1 when the basket member 60 descends.

In operation after a tire T has been built on the tire building machine, the operator places the tire in the chute 12 and the tire rolls down the inclined surface 30 into engagement with the gate arm 40. The presence of the tire T at this position actuates a photocell 72 mounted on the rotatable section 38. A photocell 74 in line with the basket member 60 indicates when the basket member is empty. Limit switch 76 mounted on the mast member 16 indicates when the carrier 14 is in the lower position L. Accordingly when simultaneously the photocell 72 indicates a tire T is in the chute 12, the photocell 74 indicates the basket member 60 is empty and the limit switch 76 indicates the carrier 14 is in the lower position L, the piston and cylinder 46 is actuated and rotatable section 38 rotated in the clockwise direction around horizontal axis H from the position shown in FIG. 1 to the position shown in FIG. 4. The tire T then rolls into the basket member 60 actuating the photocell 74. The motor 58 is then actuated raising the carrier 14 to the intermediate position I where a limit switch 78 is actuated to stop the motor and hold the tire T in that position.

Photocell 82 is mounted on the hook conveyor 18 at a position before the hooks 22 reach the upper position U of the carrier 14 to indicate the approach of a hook. Photocell 84 on the hook conveyor 18 indicates the presence of a tire T on the hook 22 as it approaches the upper position U of the carrier 14. When the photocell 82 is actuated indicating the approach of a hook 22 and the photocell 84 is actuated indicating the presence of a tire on the approaching hook, the carrier is maintained in the intermediate position I to permit the hook and tire to pass by. In the event that the photocell 84 indicates the approaching hook 22 is empty, that the previous hook has passed photocell 88 in the hook conveyor 18 and photocell 82 is actuated, then the motor is started to raise the carrier 14 from the intermediate position I to the upper position U. The hook 22 may then be moved through the central aperture of the tire T in the carrier 14 and engages a sidewall of the tire to move it out of the carrier and onto the hook conveyor 18 in the position shown in full lines in FIG. 1.

As the tire T is moved out of the carrier 14, photocell 86 mounted on the hook conveyor 18 determines whether the hook 22 has picked up the tire and carried it away. If this is the case, the motor 58 is actuated to lower the carrier 14 from the upper position U to the lower position L. As the carrier 14 is lowered, the cam follower 64 engages the cam surface of the cam 62 and rotates the basket member 60 into position for receiving another tire T from the chute 12.

After the tire T rolls from the rotatable section 38 of the chute 12 into the carrier basket member 60, the photocell 72 indicates the tire has left this section causing the piston and cylinder 46 to be actuated as by opening the cylinder to pressure air and the rotatable section is swung around the horizontal axis H into the position shown in FIG. 1. If there is another tire T in the chute 12, this tire will then roll into the rotatable section 38 and the process of loading the tire on the hook conveyor 18 is repeated automatically. In this way the operator of the tire building machine need only place the tire in the chute 12. This eliminates the manual handling of the tires T as well as the waiting time which the operator has heretofore experienced when the tires were loaded manually on the hook conveyor 18.

In the embodiment shown, the hook conveyor 18 is in a position where the tire T must be rotated 90 degrees into alignment with the hooks 22. It is understood that in other manufacturing plants the conveyors may be at positions where the tires need not be turned as much as 90 degrees. Accordingly the cam member 62 has a cam surface which may be designed for the smaller swinging movement. Likewise the swinging movement of the basket member 60 may be limited by a stop so that the compression spring 66 will only move the basket member the desired amount.

Although the piston and cylinder 46 in the preferred embodiment is pneumatic and the motor 58 is electric, it is also understood that other power means may be utilized to actuate the gate means and raise the carrier 14 from the lower position L to the intermediate position I and the upper position U.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for storing, transferring and aligning tires to continuously movable hooks along the path of a hook conveyor from a position spaced from and below said conveyor comprising a tire carrier having a basket member, a chute having an inclined supporting surface extending from an entrance end to an exit end, gate means for retaining and releasing the tires located at said exit end, said gate means being rotatable about a generally horizontal axis for lowering at least one of said tires into said basket member, said tire carrier being movable vertically along a vertical mast member between a lower position adjacent and below said exit end of said chute for receiving said tires in said basket member and an upper position with said basket member in the path of said hook conveyor for transferring said tires to said hook conveyor, power means for raising and lowering said carrier between said lower position and said upper position, means for rotating said basket member about a vertical axis a predetermined amount to move said tires in said upper position into alignment with the path of said hook conveyor for movement of one of said movable hooks of said conveyor into the central aperture of one of said tires for engagement with one side of the sidewall to move said tire out of said basket member, said carrier comprising a slide member slidably mounted on said mast member for vertical movement and said basket member being pivotally connected to said slide member for rotational movement of said basket member about a vertical axis, cam means for rotating said basket member in one direction and resilient means for rotating said basket member in the opposite direction.

2. Apparatus as claimed in claim 1, said power means including an elongated flexible support member connected to a motor and to said carrier for raising and lowering said carrier.

3. Apparatus as claimed in claim 1, said cam means including a cam connected to said mast member and a cam follower mounted on said basket member, said resilient means including spring means between said slide member and said basket member.

4. Apparatus as claimed in claim 1, said spring means rotating said basket member to a position with said tires in alignment with the path of the hook conveyor upon raising of said carrier and said cam means rotating said basket member to a position in alignment with said tires in said chute upon lowering of said carrier.

5. Apparatus as claimed in claim 1, said power means being operable to raise said carrier from said lower position to an intermediate position below said path of said hook conveyor in response to the condition that at least one of said tires is located in said basket member.

6. Apparatus as claimed in claim 5, said power means being operable to raise said carrier from said intermediate position to said upper position in response to the condition that a hook of said hook conveyor is approaching and said hook is empty.

7. Apparatus as claimed in claim 6, said power means being operable to lower said carrier from said upper position to said lower position in response to the condition that one of said tires has been transferred to said hook and moved out of said basket member.

* * * * *